United States Patent
Coombs

(10) Patent No.: US 6,389,642 B1
(45) Date of Patent: May 21, 2002

(54) STRAIN RELIEF

(75) Inventor: Richard L. Coombs, Boise, ID (US)

(73) Assignee: Pro-Team, Inc., Boise, ID (US)

( * ) Notice: Subject to any disclaimer, the term of this patent is extended or adjusted under 35 U.S.C. 154(b) by 0 days.

(21) Appl. No.: 09/605,578

(22) Filed: Jun. 28, 2000

(51) Int. Cl.$^7$ ............................................... H01R 13/58
(52) U.S. Cl. ............................................ 16/2.5; 16/2.1
(58) Field of Search ...................... 16/2.5, 2.1; 248/56; 174/152 G, 153 G, 65 R, 65 G

(56) References Cited

U.S. PATENT DOCUMENTS

| | | | |
|---|---|---|---|
| 3,439,112 A | 4/1969 | Brown et al. | 174/153 |
| 3,521,220 A | 7/1970 | Clarke, Jr. et al. | 339/62 |
| 3,753,214 A | 8/1973 | Durocher et al. | 339/102 R |
| 3,861,778 A * | 1/1975 | Capra | 174/65 G |
| 4,032,214 A | 6/1977 | McNerney | 339/218 M |
| 4,043,630 A | 8/1977 | Suverison et al. | 339/218 M |
| 4,718,865 A | 1/1988 | Cordeiro | 439/606 |
| 4,738,636 A * | 4/1988 | Bolante | 174/65.55 |
| 4,912,287 A * | 3/1990 | Ono et al. | 174/153 G |
| 5,000,695 A | 3/1991 | Nishiyama et al. | 439/276 |
| 5,414,218 A * | 5/1995 | Nathan | 174/140 R |
| 5,659,924 A * | 8/1997 | Gildersleeve | 16/2.1 |
| 5,735,021 A * | 4/1998 | Briggs | 16/2.1 |

FOREIGN PATENT DOCUMENTS

DE 3826474 A1 * 2/1990

* cited by examiner

Primary Examiner—Chuck Y. Mah
(74) Attorney, Agent, or Firm—Frank J. Dykas; Stephen M. Nipper; Robert L. Shaver

(57) ABSTRACT

A strain relief for protection of electrical and other cords extending from a component. The strain relief is made from a hard plug piece which attaches to the case or housing of the component. The cord extends through this plug piece via a passageway. This plug piece has a plurality of holes therethrough which connect the passageway with its outer surface. An molded jacket is molded onto the plug piece, wherein the injected material extends through the holes, into the passageway, and surrounding the cord. The injected material is preferably softer than the material used for the plug piece. The result is a one piece strain relief which is bonded to the cord.

20 Claims, 6 Drawing Sheets

STRAIN RELIEF

BACKGROUND OF THE INVENTION

1. Field of the Invention

The present invention generally relates to electrical cables, and more particularly to electrical cable strain reliefs and methods of manufacture thereof.

2. Background Information

Strain reliefs are used in generally all electrical components having power cords needing to be plugged into a wall receptacle. These power cords typically extend through an opening in the case or housing of the component. If left unprotected, the power cord would soon fray due to the friction of rubbing against the case opening.

A first purpose of a strain relief is to protect the electrical cord from rubbing against the edges of the opening. A second purpose of a strain relief is to relieve bending strains in the cord as it bends at or near its connection with the opening.

FIG. 1 and FIG. 2 show a common type of prior art strain relief. This type strain relief has a threaded first piece 2 which is typically fastened to the body of the appliance through use of a threaded nut (not shown). This first piece 2 has an extended compression ring through which the wire 5 is inserted. The threaded second piece 4 of the strain relief is then threaded on and compresses the compression ring against the wire. This works reasonably well except in heavy duty applications, such as in commercial vacuum cleaners.

The problem is that as the wire and the threaded strain relief are continuously pulled, twisted and flexed, the compression ring is working fixedly against the power cord, and eventually will start to fray and break the metal strands within the wires within the cord. When this occurs, it will eventually result in a dead short and the heat from the short will melt the threaded strain relief A second type of prior art strain relief is used on some lighter duty appliances. These strain reliefs are a single piece which is directly molded on the cord. They are formed by placing the wire cord in a jig, closing up the jig, and injecting PVC to directly bond the strain relief to the outer jacket of the electric cord. However, this is not done with threaded ends because the material is not strong enough to hold a threaded end. This type of direct, injected strain relief is typically used on thin, plastic cases for appliances where the soft cord has a washer-like protrusion on the end which fits into notches between two halves of the case that are then later joined together.

What is needed is a strain relief which overcomes the shortcomings of the prior art. The present invention serves this purpose.

SUMMARY OF THE INVENTION

The present invention is a two-part strain relief. At one end is a threaded end which is hard, preferably glass-filled nylon, which is slid over the cord. The threaded end has two flanges attached to it, and has holes in its shaft so that when direct molded PVC (or other pliable material) is later injected, the PVC will go through the holes and encase the two flanges thereby holding the threaded end tightly bonded to the flexible PVC end.

With this new type of strain relief, there is no compression of the cord, and as a result its life expectancy is significantly greater. The hard threaded end is amenable for use in a variety of applications, from extending through a hole in a metal container, and more importantly, through a hole in a rotational molded container where the thickness of the roto-molded container case wall can vary substantially from part to part, thus necessitating the use of a threaded end.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
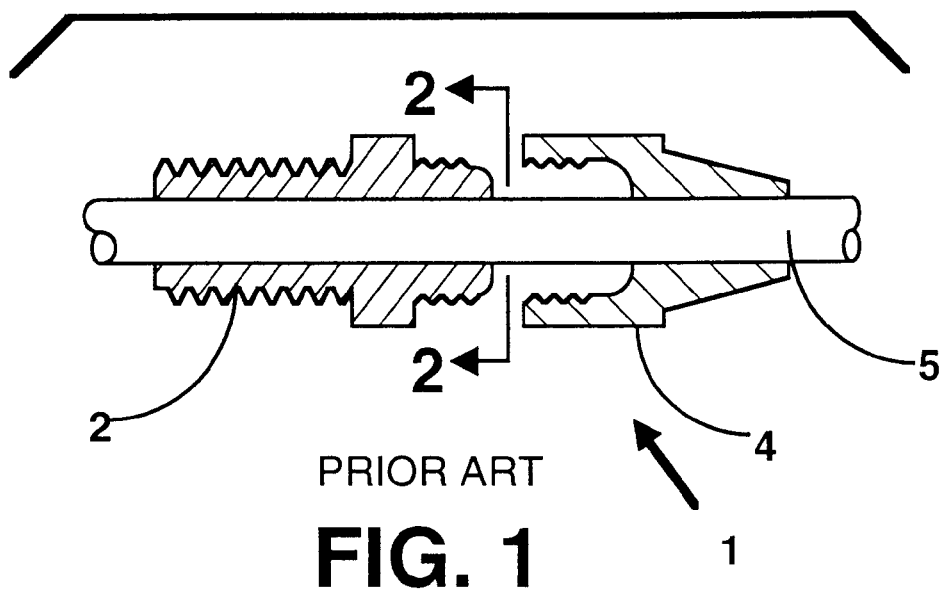
FIG. 1 (PRIOR ART) is a cross-sectional view of one type of prior art strain relief.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 2:
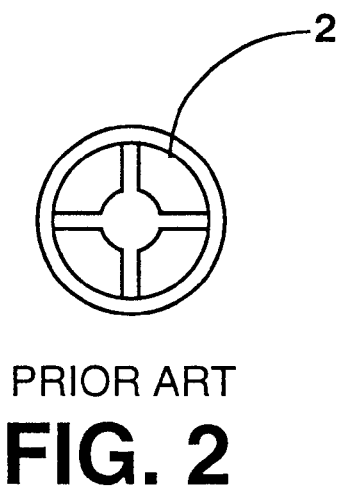
FIG. 2 (PRIOR ART) is a partial end view of FIG. 1.

FIGS. 1 and 2 show prior art strain reliefs which are discussed above in the Background Information section of the Background of the Invention.

Figure 3:
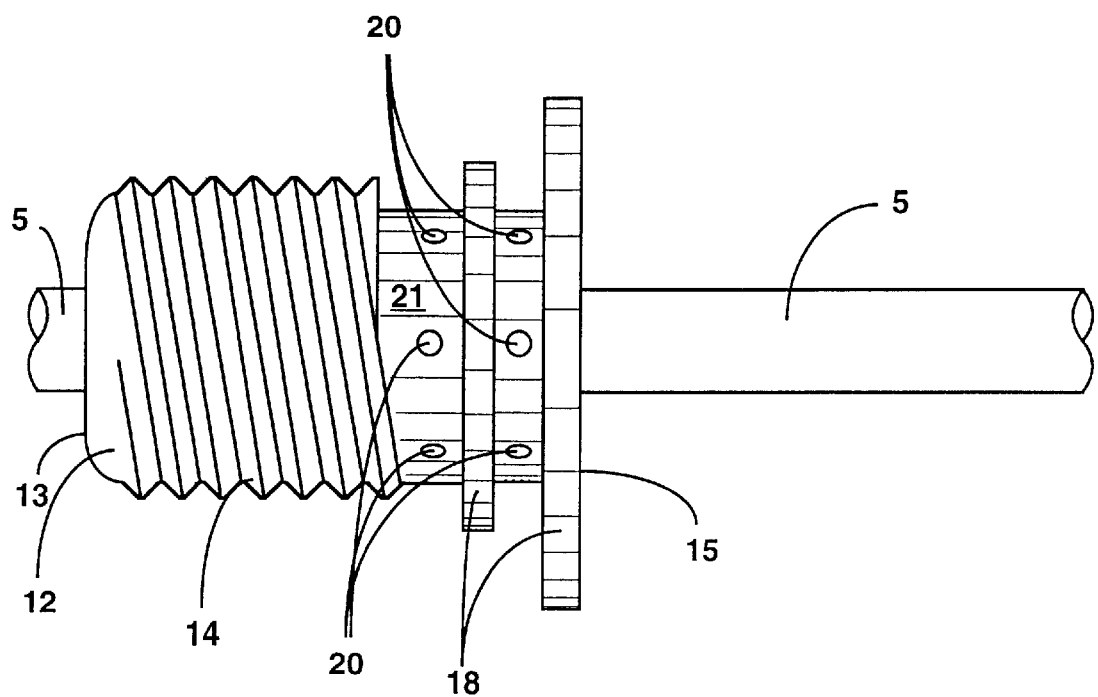
FIG. 3 is a side view of the plug portion of the new strain relief.

Referring initially to FIG. 3, shown is the plug portion 12 of the present invention. In this embodiment, the plug portion 12 comprises a generally elongate cylinder having a passageway therethrough for receiving a cord 5. The plug portion 12 has a first end 13 and a second end 15. The first end 13 is threaded, having a threaded portion 14 for cooperating with an attachment means, such as a fitting or nut. The attachment means is used to attach the plug portion 12 of the present invention to a housing or other rigid structure. The attachment means can be any type known to the industry, including, but not limited to threaded nuts, pins, screws, adhesives, melting, clamps, and other types of fittings.

The plug portion 12 additionally has a plurality of ports 20 extending from the exterior surface 21 of the plug portion 12 to the passageway extending through the plug portion 12 which receives the cord 5. These ports 20 are preferably nearer the second end 15 than the first end 13.

The plug portion 12 also preferably contains at least one retainer band 18 or other protuberance from its exterior surface for securing the plug portion 12 in the molded jacket described infra. In the embodiment shown, a pair of retainer bands or flanges 18 can be found circumscribing the plug portion 12 near the second end 15.

It is preferred that the plug portion 12 of the present invention be separately molded from a hard material, such as glass-filled nylon. The plug portion 12 is then fitted on the cord 5 by inserting one end of the cord 5 into one of the ends of the passageway of the plug portion 12, and extending the cord 5 therethrough.

Figure 4:
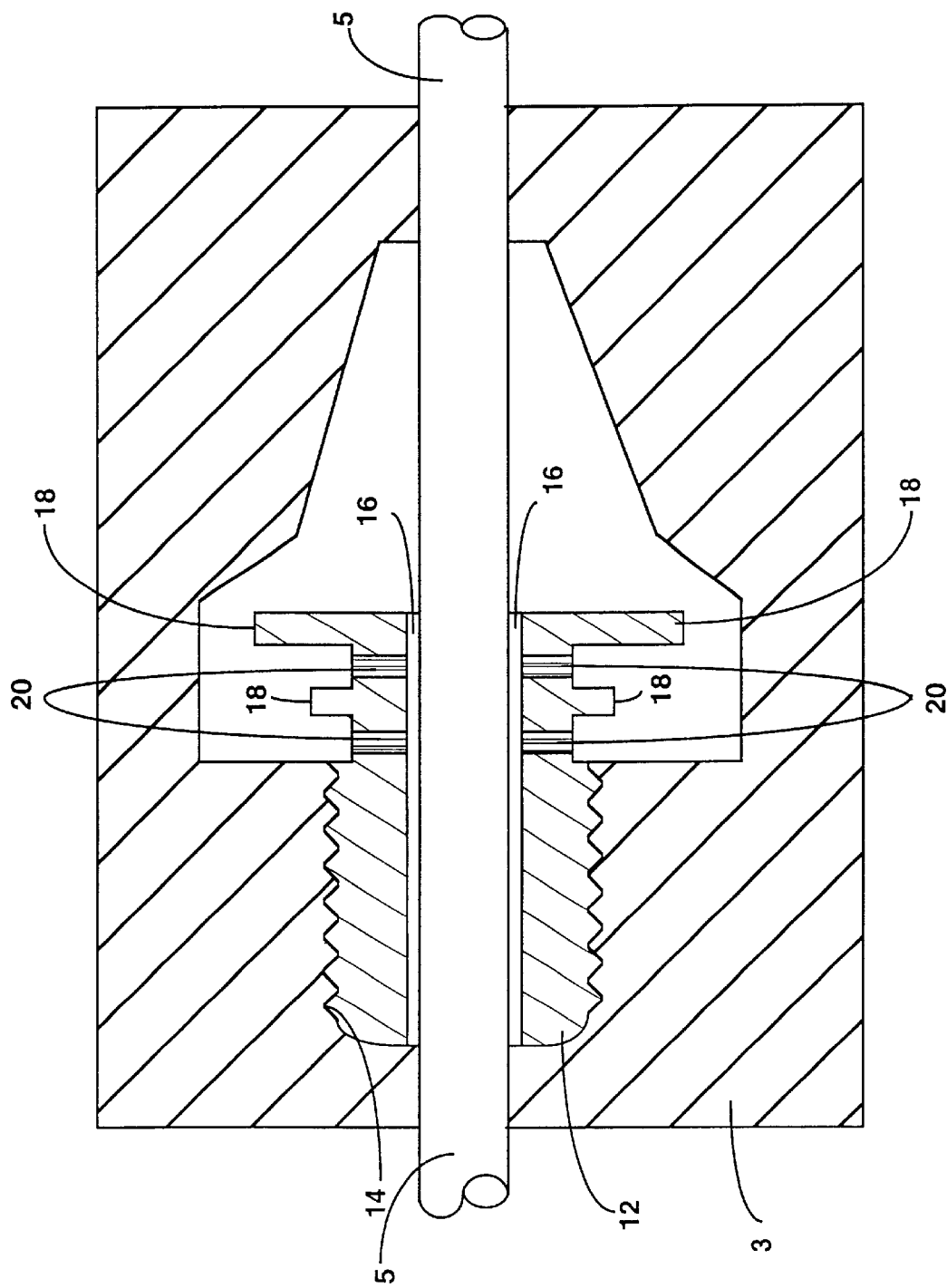
FIG. 4 is a side, cross-sectional view of the new strain relief plug and wire held in a mold.
Figure 5:
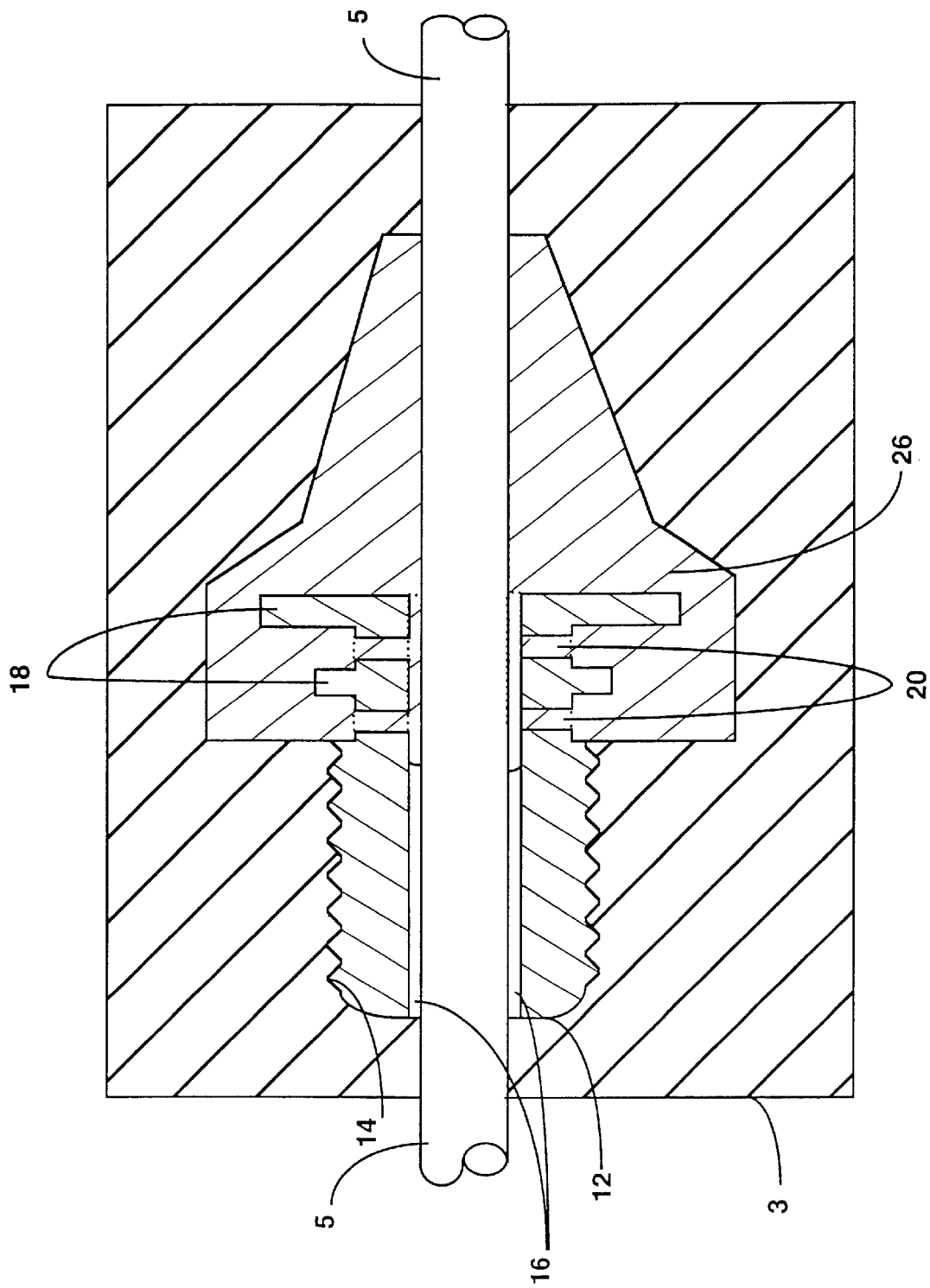
FIG. 5 is a side, cross-sectional view of the new strain relief held in a mold with a molded jacket formed.

Now referring to FIGS. 4 and 5, to manufacture the present invention, first, one of the plug portions 12 having the cord 5 extending through the passageway 16, is inserted into a mold of jig 3. This mold may be threaded so as to receive threads of the plug portion 12, if the plug portion 12 has threads. This figure shows the ports 20 extending through the plug portion 12, opening up into the passageway 16. The passageway 16 is preferably slightly larger in diameter than the cord 5 so that a gap remains between the cord 5 and the side walls of the passageway 16.

FIG. 5 shows the molded jacket 26 in place after an injected material has been injected into the mold 3. The preferred matter of composition of the molded jacket 26 is polyvinyl chloride (PVC), however other materials may also be used. It is preferred that the material used for the molded jacket 26 be more flexible than the material used for the plug portion 12. This figure particularly shows how the injected material is able to travel through the ports 20 and into the passageway 16. In such a manner, the injected material surrounds the cord 5 in at least a portion of the passageway. The injected material furthermore encases the retainer bands 18, thereby fixedly attaching the jacket 26 to the plug 12.

Figure 6:
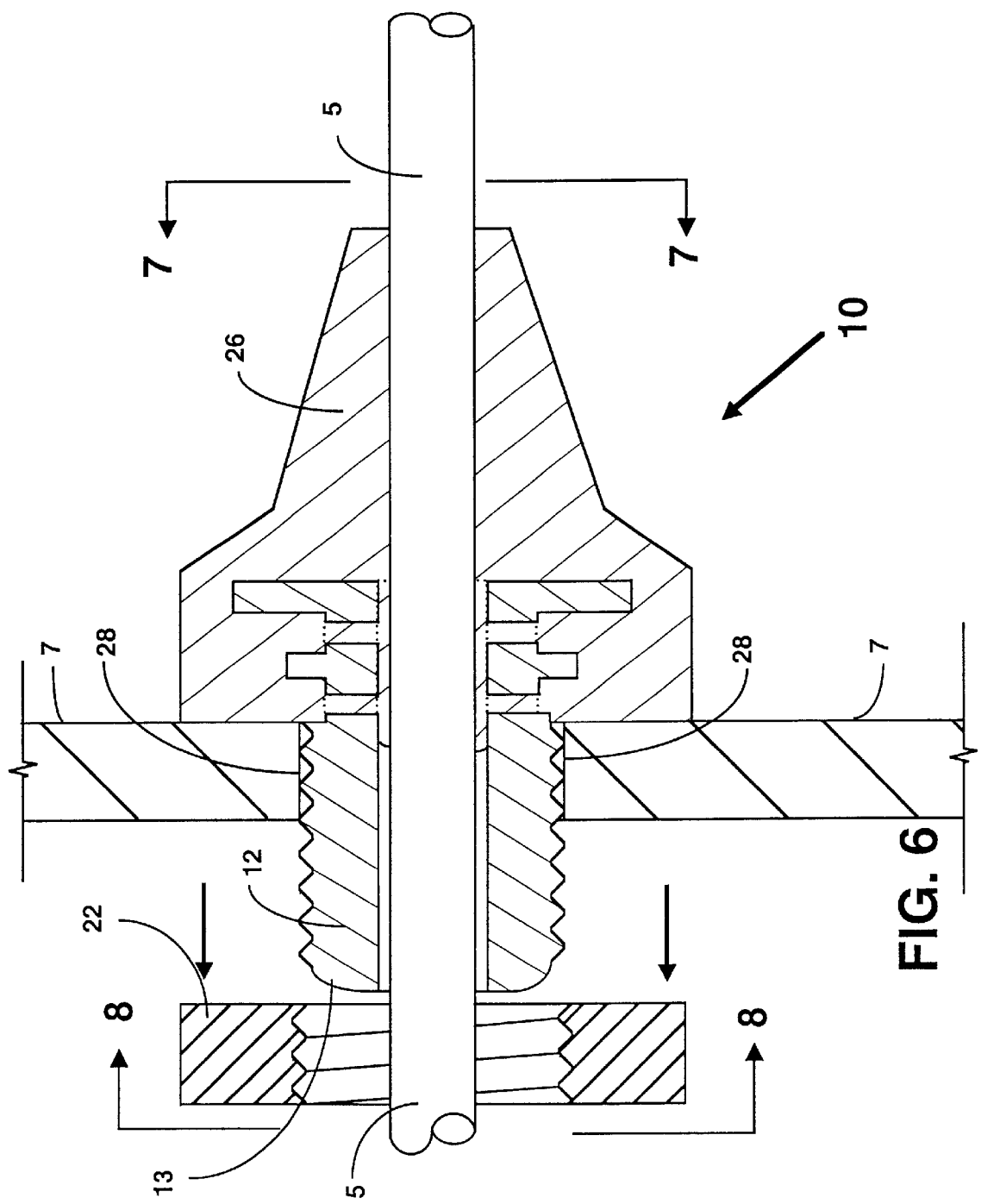
FIG. 6 is a side, cross-sectional view of the fully formed strain relief.

Referring now to FIG. 6, the present invention 10 has been removed from the mold of FIGS. 4 and 5, and the first end 13 of the plug portion 12 has been inserted through the cord hole 28 of the component housing 7. In such a manner, the first end 13 can be secured to the housing through a fitting 22, such as the nut shown, or by other means.

Figure 7:
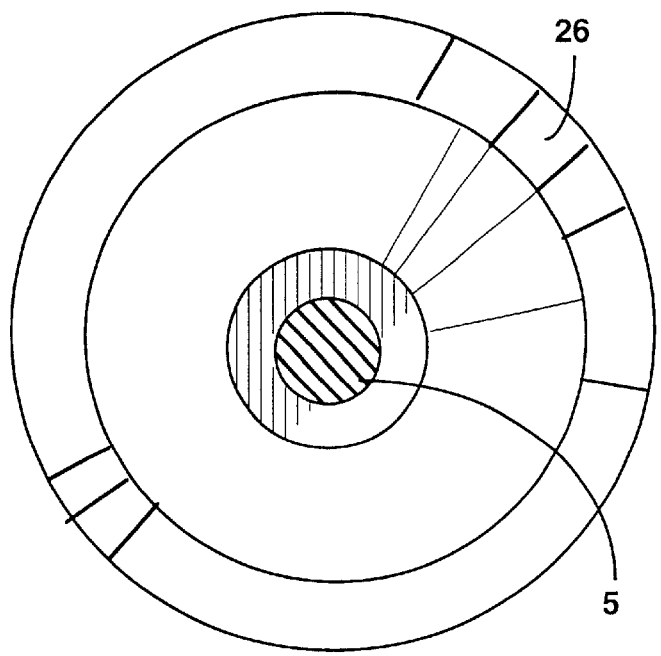
FIG. 7 is a first end view taken along the plane 7—7 of FIG. 6.
Figure 8:
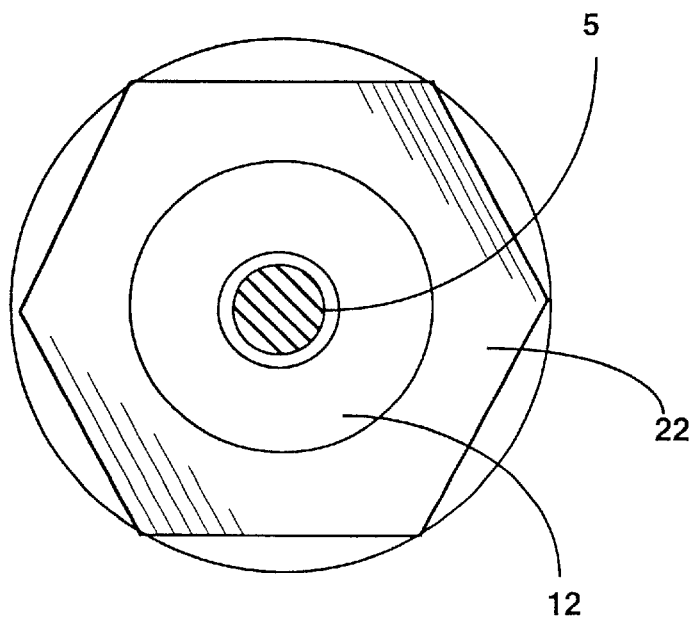
FIG. 8 is a second end view taken along the plane 8—8 of FIG. 6.

FIG. 7 and FIG. 8 show end views of the embodiment of FIG. 6.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A strain relief for protecting a cord extending through a housing, wherein said strain relief comprises:
    a plug portion, said plug portion having a cord receiving orifice extending therethrough, said cord extending through said cord receiving orifice;
    a fitting portion adapted to fix said plug portion on a housing; and
    a jacket, said jacket molded onto said plug portion, said jacket having a central orifice which surrounds a portion of said cord.

2. The strain relief of claim 1, wherein said plug portion is threaded and wherein said fitting portion is threaded.

3. The strain relief of claim 1, wherein said plug portion comprises at least one port extending from an outside surface of said plug portion to said cord receiving orifice, wherein said jacket further extends through said port and into said cord receiving orifice.

4. The strain relief of claim 1, wherein the jacket comprises a material which is more pliable than the material comprising the plug portion.

5. The strain relief of claim 4, wherein the jacket is comprised of glass-filled nylon, and the plug portion is comprised of polyvinyl chloride (PVC) plastic.

6. A strain relief for protecting the cord of an electrical component from fraying and other damage, said electrical component having a housing through which said cord extends, wherein said strain relief comprises:
    a generally cylindrical plug portion, said plug portion having a passageway therethrough extending generally along the axis of said cylindrical plug portion, said plug portion having a first end and a second end, said plug portion containing at least one port extending from an exterior surface of said plug portion to said passageway near said second end;
    an attachment means for attaching said plug portion to said housing; and
    a jacket molded onto said plug portion, said jacket covering said plug portion second end, extending through said ports, into said passageway, and around said cord extending through said plug portion passageway, said jacket further extending outwards from said second end, parallel to said cord.

7. The strain relief of claim 6, wherein said first end is threaded, and wherein said attachment means is a threaded nut.

8. The strain relief of claim 6, wherein said plug portion further comprises at least one protuberance extending out from said plug portion near said second end.

9. The strain relief of claim 8, wherein said protuberance further comprises at least one retainer band circumscribing said plug portion near said second end, said molded jacket molded around said band.

10. The strain relief of claim 6, wherein the molded jacket comprises a material which is more pliable than the material comprising the plug portion.

11. The strain relief of claim 10, wherein the molded jacket is comprised of glass-filled nylon, and the plug portion is comprised of polyvinyl chloride (PVC) plastic.

12. The strain relief of claim 11 wherein said at least one port further comprises a plurality of ports extending through said plug portion to said passageway near said second end, wherein said molded jacket further extends through said ports, into said passageway, and around said cord extending through said plug portion passageway.

13. A strain relief for protecting the cord of an electrical component from fraying, said electrical component having a housing through which said cord extends, wherein said strain relief comprises:
    an elongated plug portion, said plug portion having a passageway extending longitudinally therethrough, said plug portion having a first end and a second end, wherein said first end is threaded, and wherein at least one retainer band circumscribes said plug portion near said second end;
    a threaded fitting adapted to thread onto said plug portion at said plug portion first end; and
    a jacket molded onto said plug portion, said jacket covering said plug portion second end, said jacket further encasing said retainer band, said jacket further extending outwards from said second end, parallel to said cord, and defining a passage for said cord and surrounding said cord.

14. The strain relief of claim 13, wherein the molded jacket comprises a material which is more pliable than the material which the plug portion is comprised of.

15. The strain relief of claim 14, wherein the molded jacket is comprised of glass-filled nylon, and the plug portion is comprised of polyvinyl chloride (PVC) plastic.

16. A strain relief for protecting the cord of an electrical component from fraying, said electrical component having a housing through which said cord extends, wherein said strain relief comprises:

a generally cylindrical, glass-filled nylon plug portion, said plug portion having a passageway therethrough extending generally along the axis of said plug portion cylinder, said plug portion having a first end and a second end, wherein said first end is threaded, wherein a plurality of retainer bands circumscribe said plug portion near said second end, said plug portion containing a plurality of ports extending through said plug portion to said passageway near said second end;

a threaded, glass-filled nylon fitting adapted to thread onto said plug portion at said plug portion first end;

a polyvinyl chloride jacket molded onto said plug portion, said jacket covering said plug portion second end, extending through said ports, into said passageway, and around said cord extending through said plug portion passageway, said jacket further encasing said retainer bands, said jacket further extending outwards from said second end, parallel to said cord.

17. A strain relief for protecting a cord extending through a housing, wherein said strain relief comprises:

a plug portion, said plug portion having a cord receiving orifice extending therethrough, said cord extending through said cord receiving orifice, wherein said plug portion comprises at least one port extending from an outside surface of said plug portion to said cord receiving orifice;

a fitting portion adapted to fix said plug portion on a housing; and a molded jacket attaching to a portion of said plug portion with a central orifice which surrounds a portion of said cord, wherein said molded jacket further extends through said port and into said cord receiving orifice.

18. A strain relief for protecting the cord of an electrical component from fraying and other damage, said electrical component having a housing through which said cord extends, wherein said strain relief comprises:

a generally cylindrical plug portion, said plug portion having a passageway therethrough extending generally along the axis of said cylindrical plug portion, said plug portion having a first end and a second end, said plug portion containing a plurality of ports extending from an exterior surface of said plug portion to said passageway near said second end;

an attachment means for attaching said plug portion to said housing; and a jacket molded onto said plug portion, said jacket covering said plug portion second end, extending through said ports, into said passageway, and around said cord extending through said plug portion passageway, said jacket further extending outwards from said second end, parallel to said cord.

19. The strain relief of claim 18, wherein the molded jacket comprises a material which is more pliable than the material comprising the plug portion.

20. The strain relief of claim 19, wherein the molded jacket is comprised of glass-filled nylon, and the plug portion is comprised of polyvinyl chloride (PVC) plastic.

* * * * *